_United States Patent_ [19]

Totani

[11] Patent Number: 5,029,927
[45] Date of Patent: Jul. 9, 1991

[54] APPARATUS FOR OPENING AND CLOSING REAR DOOR OF VEHICLE

[76] Inventor: Hideo Totani, 5 Banchi 1092, Hagihara, Hagihara-Chou, Mashita-Gun, Gifuken, Japan

[21] Appl. No.: 506,047
[22] Filed: Apr. 9, 1990
[51] Int. Cl.⁵ .............................................. B62D 25/04
[52] U.S. Cl. ........................................ 296/50; 49/264
[58] Field of Search ................... 296/50; 49/264, 261, 49/366–369

[56] References Cited

U.S. PATENT DOCUMENTS

| 3,464,734 | 9/1969 | Chieger | 296/50 |
| 3,558,184 | 1/1971 | Plegat | 296/146 |
| 4,693,033 | 9/1987 | Tauzin | 49/246 |

FOREIGN PATENT DOCUMENTS 939333  6/1982  U.S.S.R. .

Primary Examiner—Robert R. Song
Attorney, Agent, or Firm—Edwin E. Greigg; Ronald E. Greigg

[57] ABSTRACT

This invention relates to an apparatus for opening and closing a rear door of a vehicle such as a dump truck. The rear door of the vehicle is bisected into left and right rear door sections. When opened, the bisected left and right rear door sections are moved toward the outsides of the both side walls of the bed of the vehicle by the power of a drive cylinder provided on the lower surface of the floor of the bed of the vehicle, respectively. When the operating rod of the drive cylinder is extended, each of the left and right rear door sections is moved through a single or a plurality of links. Arcuate portions are preferably formed on the inner wall surfaces on the sides of respective out side end portions of the left and right rear door sections so that the door sections, when being opened, can be smoothly moved around the rear edges of said side walls to positions outside the side wall.

14 Claims, 5 Drawing Sheets

APPARATUS FOR OPENING AND CLOSING REAR DOOR OF VEHICLE

BACKGROUND OF THE INVENTION

This invention relates to an apparatus for opening and closing a rear door of a vehicle such as a dump truck.

Hitherto, several apparatus for opening and closing a rear door of a vehicle have been already proposed. For example, the device disclosed in the Utility Model Publication No. 1783/87 employs an arrangement in which a hydraulic cylinder for opening and closing a rear door is used to open the rear door in a state horizontal relative to the floor surface of the bed. Further, the invention disclosed in the Patent Application No. 205483/89 which was previously filed by the same applicant as the applicant of this invention employs an arrangement comprising a bent link connected to the lower end portion of the rear door through a turn buckle and a receiving metal fitting pivotally affixed on the frame at a lower part of the bed so as to be able to support the free end of the bent link, thus to open the rear door in a state horizontal relative to the floor surface of the bed in a manner similar to that in the above-mentioned embodiment.

However, since these embodiments are both constituted so as to open the rear door in a backward direction of the bed, when letting a load down, the load slides on the inner wall surface of the rear door and falls down therefrom, so the rear door is injured and a weight of the load is directly or indirectly applied to the rear door or respective members, giving rise to a problem of lowered durability. Further, when closing the rear door, such a way or manner is taken to force or thrust up the rear door. This requires a considerably large force, resulting in the drawback that the hydraulic cylinder must be large-sized, and the like.

SUMMARY OF THE INVENTION

With the drawbacks with the above-mentioned prior arts in view, an object of this invention is to provide an apparatus for opening and closing a rear door of a vehicle, which is constructed so that, when letting a load down, the inner wall surface of the rear door is not injured and that a weight of the load is not applied to respective members constituting the rear door and/or the opening and closing apparatus, resulting in little possibility of damage or breakdown, and which is capable of smoothly opening and closing the rear door with a small and inexpensive hydraulic cylinder.

An apparatus for opening and closing a rear door of a vehicle according to this invention includes bisected left and right rear door sections, drive and driven links pivotally attached on each of these left and right rear door sections and guiding the left and right rear door sections to the respective outsides of the both side walls of the bed, and a drive cylinder provided on the lower surface of the floor of the bed, the front end of an operating rod being pivotally on the inner end portion of drive link.

Further, the apparatus for opening and closing a rear door of a vehicle according to this invention comprises bisected rear door sections, a drive cylinder provided on the lower surface of a bed, and connecting links each having an inner end portion pivotally supported on an operating rod of the drive cylinder and an outer end portion affixed to the outside end portion of each rear door section, inner wall surfaces on the sides of the outside end portions of the left and right rear door sections being formed arcuate, respectively.

DESCRIPTION OF THE PREFERRED EMBODIMENTS

Preferred embodiments will now be described with reference to the attached drawings.

Figure 1:
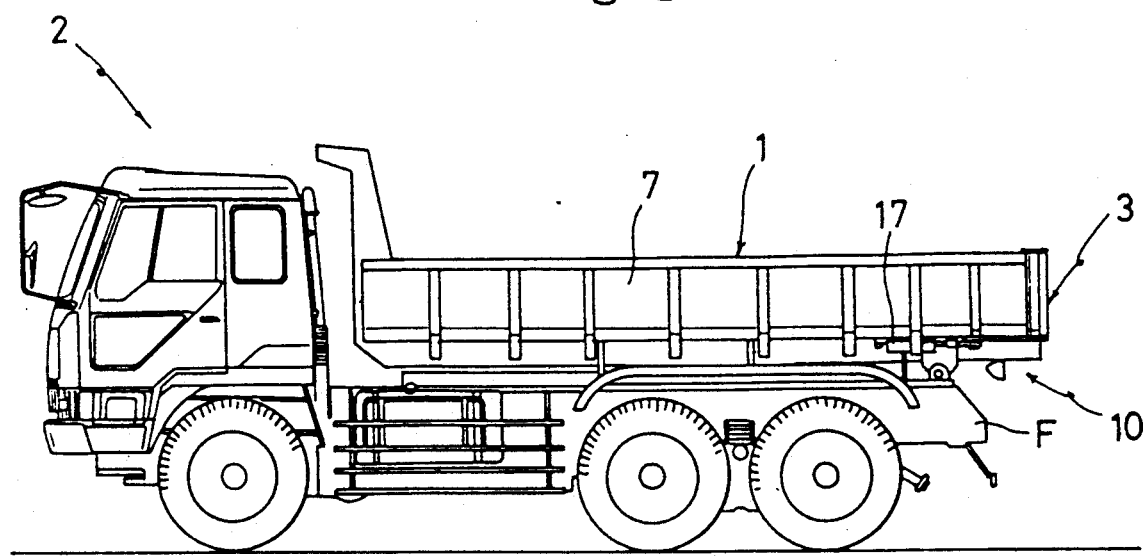
FIG. 1 is a side view of a vehicle illustrating an example where an apparatus for opening and closing a rear door of a vehicle according to an embodiment of this invention is used.
Figure 2:
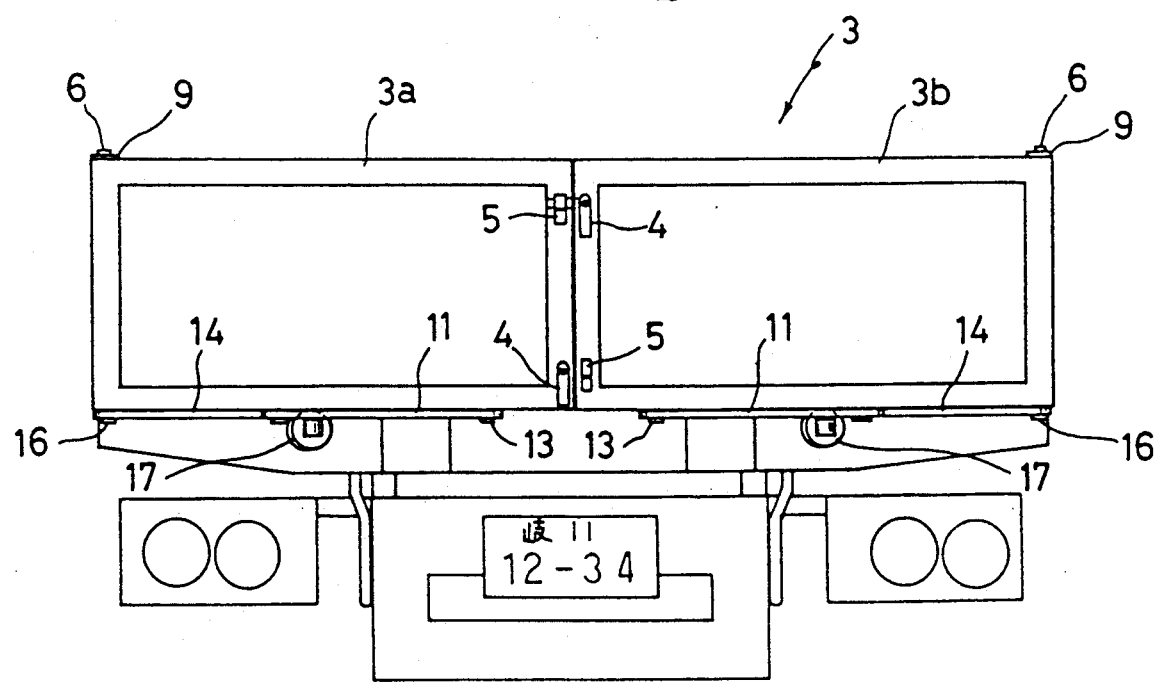
FIG. 2 is a rear view of a vehicle illustrating the essential part of the rear door opening and closing apparatus shown in FIG. 1.
Figure 3:
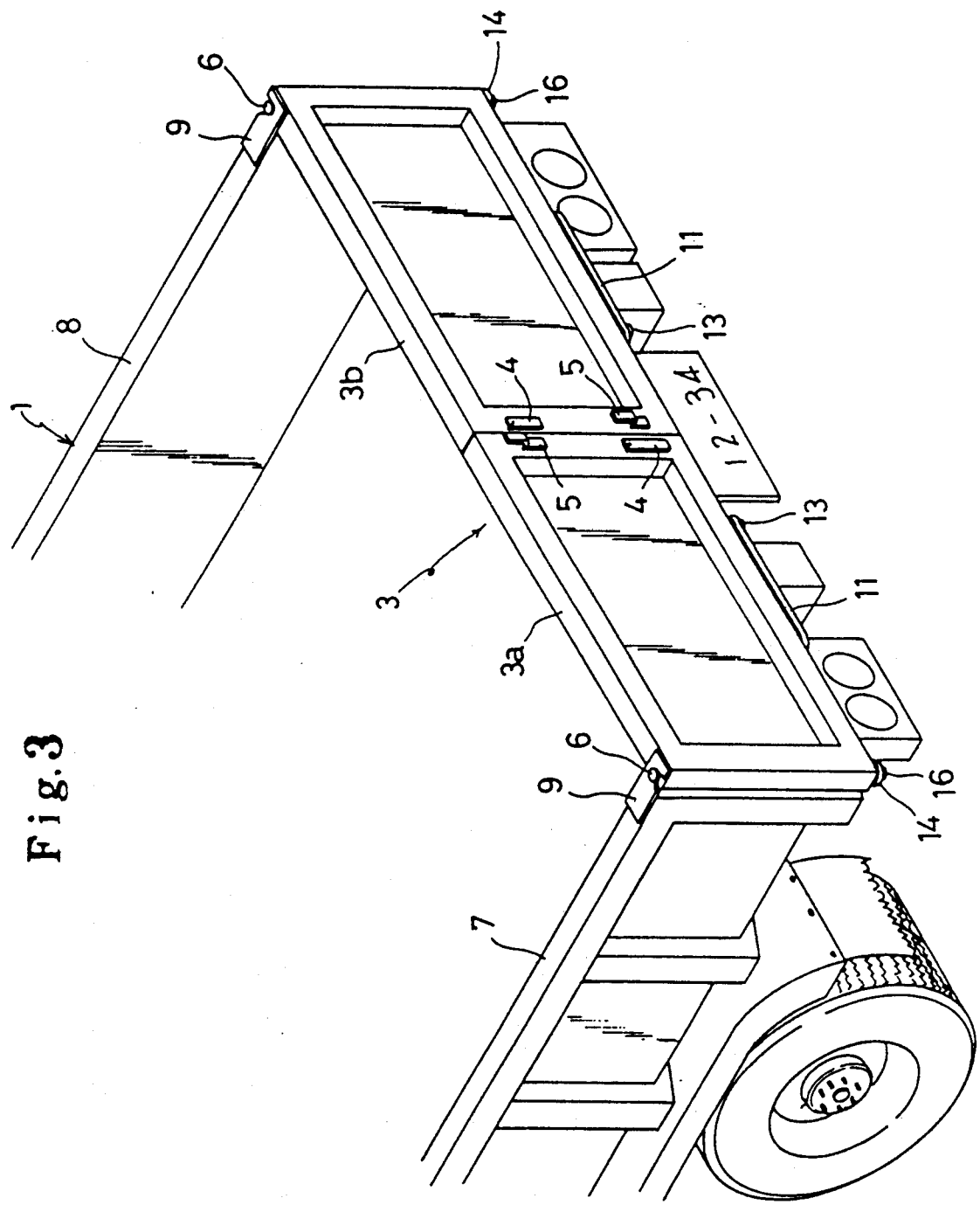
FIG. 3 is a perspective view of the rear part of a vehicle illustrating the essential part of the rear door opening and closing apparatus shown in FIG. 1.

Initially, an embodiment of this invention will be described with reference to FIGS. 1 to 6. Reference numeral 1 denotes a bed of a vehicle, i.e., a dump truck 2 in this embodiment. Reference numeral 3 denotes a rear door for covering a backward opening of the bed 1. This rear door 3 is bisected into left and right rear door sections 3a and 3b as shown in FIG. 2. Rotary stoppers 4 and receiving pieces 5 for receiving them are provided on the outer wall surfaces of the opposite inside end portions of these left and right rear door sections 3a and 3b, respectively. Reference numerals 6 denote holding pins projectedly provided on the upper surfaces of the outside end portions of the left and right rear door sections 3a and 3b, respectively. These holding pins 6 engage with left and right holding plates 9 fixedly provided in a manner to project from the upper surfaces of the rear end portions of left and right side walls 7 and 8 of the bed 1, respectively.

Figure 4:
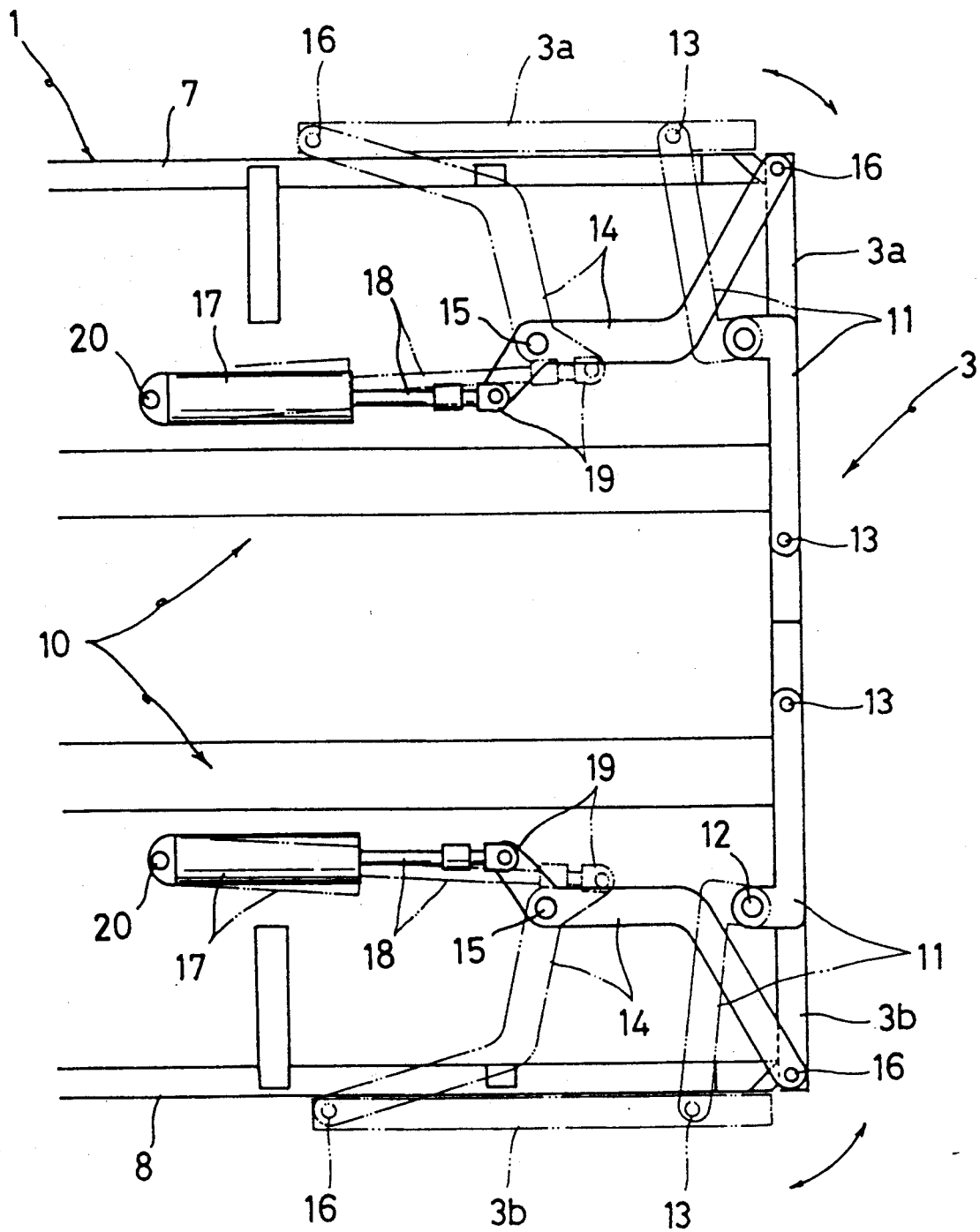
FIG. 4 is a bottom view illustrating the rear door opening and closing apparatus shown in FIG. 1.
Figure 5:
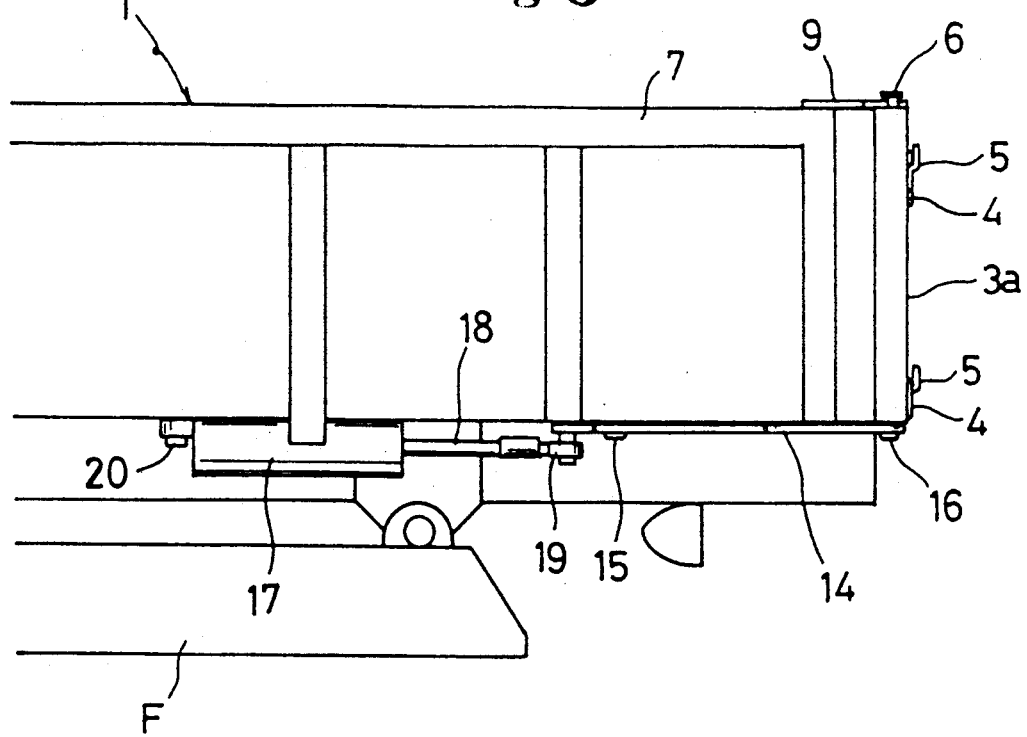
FIG. 5 is an explanatory side view of a vehicle illustrating the state where the rear door is closed.

Reference numeral 10 denotes an apparatus for opening and closing a rear door. Since the left and right parts of the rear door opening and closing apparatus 10 have the same configuration as shown in the bottom view FIG. 4, the same reference numerals are attached to the same portions on the left and right sides for convenience, respectively, and only one of the left and right parts will be described. In FIG. 4 doors 3a and 3b are shown in solid lines in a closed position and in phantom lines in an opened position.

Reference numeral 11 denotes a driven link having one end and the other end pivotally supported on the rear end portion of the lower surface of the floor of the bed 1 and the lower surface closer to the inside end portion of the rear door section 3a (3b) through pivot pins 12 and 13, respectively. This driven link 11 is formed to be L-shaped.

Reference numeral 14 denotes a drive link wherein a portion closer to one end thereof and the other end portion are pivotally supported on a portion closer to the rear end portion of the lower surface of the floor of the bed 1 and the lower surface of the outside end portion of the rear door section 3a (3b) through pivot pins 15 and 16, respectively. This drive link 14 is formed to be S-shaped as a whole.

Reference numeral 17 denotes a drive cylinder provided on the lower surface of the floor of the bed 1. The rear end portion of an operating rod 18 of the drive cylinder 17 is pivotally supported on the inner end portion of the drive link 14 through a joint member 19. In this embodiment, each drive cylinder 17 is affixed on the bed 1 through a pivot pin 20 so that it can be somewhat rotated in a horizontal direction. In addition, reference symbol F in FIG. 1 denotes a truck or a frame of a vehicle.

In the above construction, as shown in FIG. 4, when the operating rods 18 of the drive cylinders 17 are extended, the drive link 14 and the driven link 11 rotationally shift in a horizontal state from the position indicated by the solid lines to the position indicated by the phantom lines using the pivot pins 15 and 12 as fulcrums, respectively. Thus, when in an opened position, the left and right rear door sections 3a and 3b are accommodated in parallel outside the left and right side walls 7 and 8 of the bed 1, respectively. On the other hand, when the operating rods 18 of the drive cylinders 17 are contracted, the left and right rear doors 3a and 3b are rotationally moved to the original closed positions.

Figure 6:
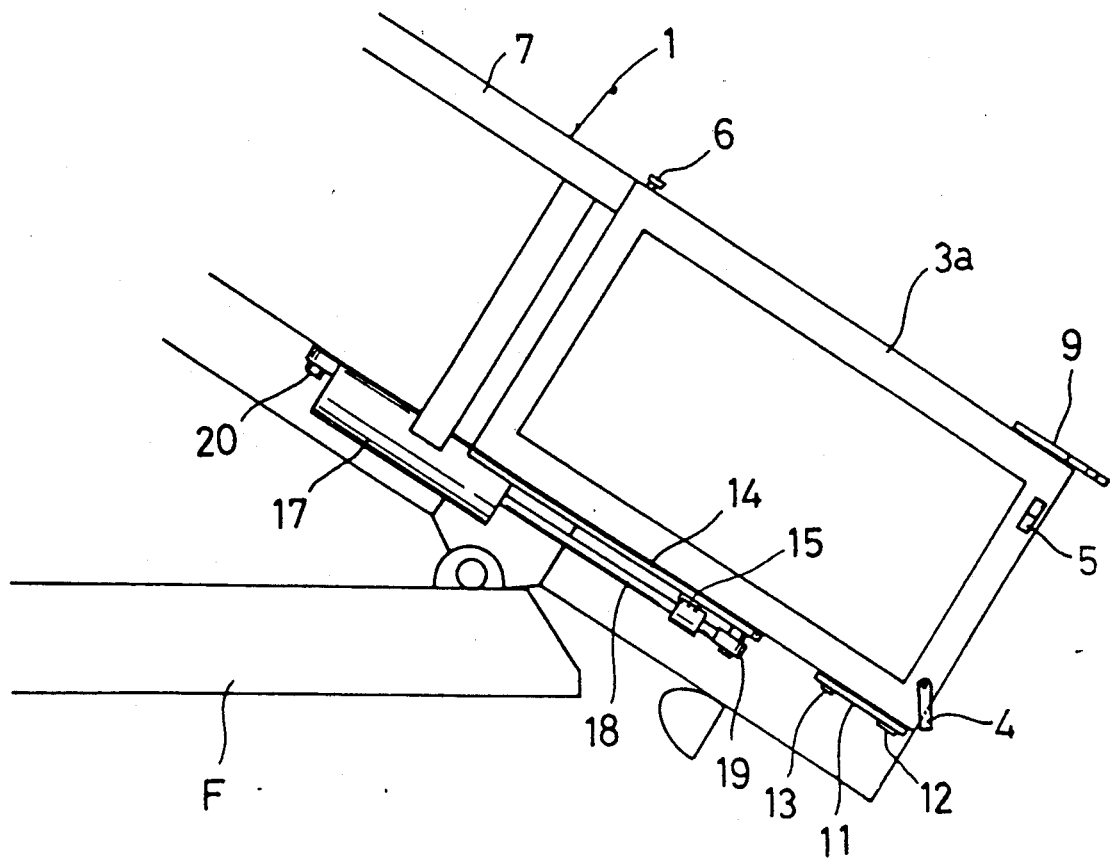
FIG. 6 is an explanatory side view of a vehicle illustrating the state where the rear door is opened and the bed of the vehicle is tilted for dumping a load.

It is to be noted that, in this embodiment, arcuate portions may be formed on the inner surfaces on the sides of the outside end portions of the left and right rear door sections 3a and 3b in order that these rear door sections can be smoothly moved, respectively. In FIG. 6 the truck bed 1 is shown in a tilted position. The door 3a is shown in an opened position alongside side wall 7. It can be seen that the load can be dumped from the truck bed without touching the opened door 3a.

Figure 7:
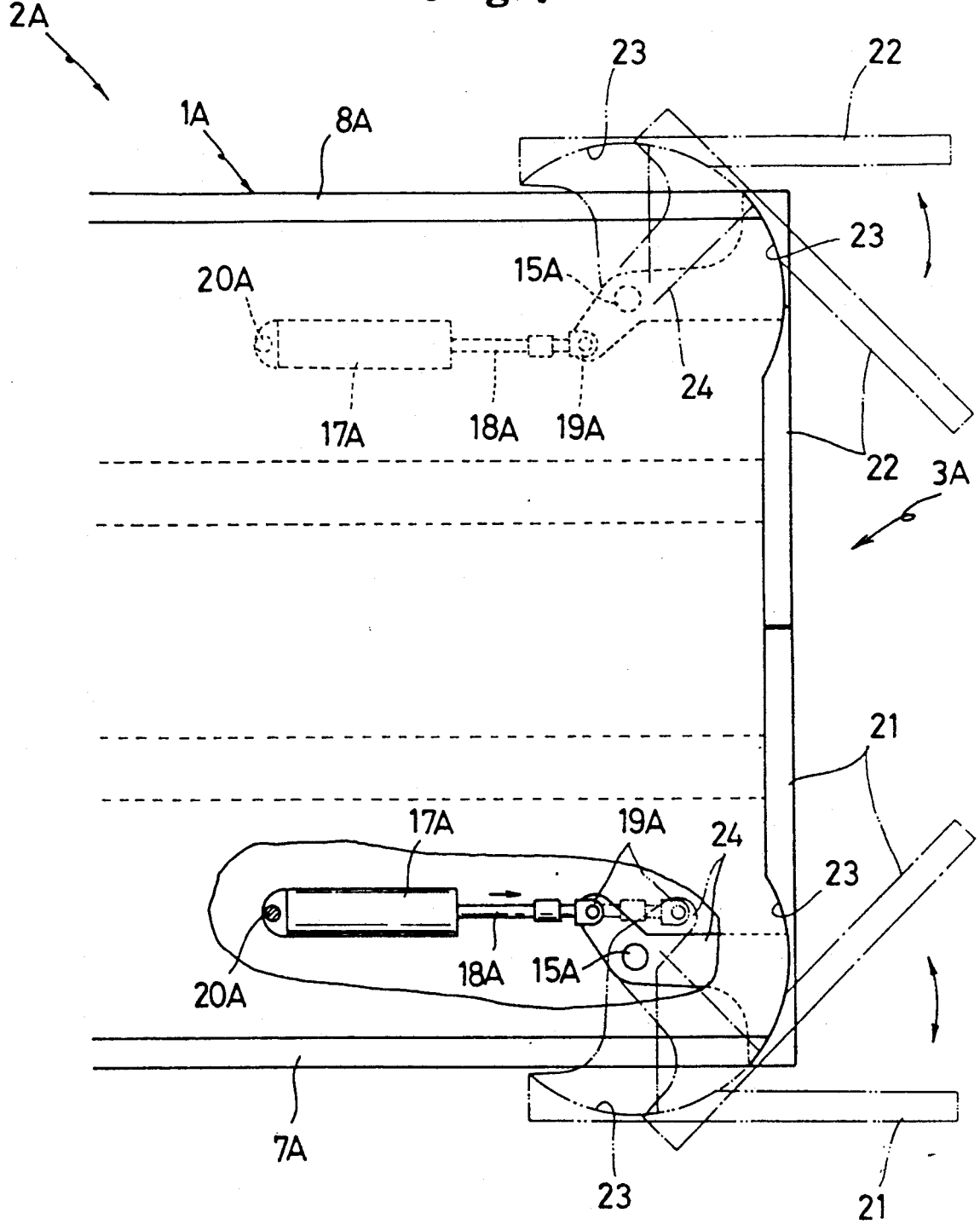
FIG. 7 is a plan view of a part of a vehicle illustrating another embodiment of this invention.

Another embodiment shown in FIG. 7 will now be described. In the description of this embodiment, the same reference numerals are attached to the same portions as those of the above-described embodiment of this invention, respectively.

In this embodiment, reference numerals 17A denote a pair of drive cylinders provided on the lower surface of the floor of a bed 1A, respectively. These drive cylinders 17A may be provided in a manner that they are rotated somewhat in a horizontal direction around pivot pins 20A, respectively, or may be provided in a fixed manner. In the case where each drive cylinder is fixedly provided, it is necessary to provide a guide hole on the side of the inner end portion of a connecting link which will be described later.

Reference numeral 3A denotes a rear door of a vehicle 2A. This rear door 3A is bisected into rear door sections 21 and 22. In this embodiment, the inner wall surfaces on the sides of the outside end portions of the left and right rear door sections 21 and 22 are formed arcuate as indicated by reference numeral 23, respectively.

Reference numerals 24 denote connecting links wherein their inner end portions are pivotally supported on operating rods 18A of drive cylinders 17A through joint members 19A and their broad outer end portions are fixedly attached on the lower surfaces of the outside end portions of the left and right rear door sections 21 and 22, respectively. These connecting links 24 are formed to be dog-leg shaped or S-shaped. Reference numerals 15A denote pivot pins for pivotally supporting the bent portions or portions closer to the inner end portions of the connecting links 24, respectively. In addition, reference symbol F denotes a truck or a frame of the vehicle 2A.

In the above-mentioned construction, when the operating rods 18A of the drive cylinders 17A are extended, connecting links 24 rotate in a horizontal direction using the pivotal pins 15 as fulcrums, respectively. Thus, the left and right rear door sections 3a and 3b are rotationally moved in a manner that their arcuate portions 23 come in slide contact with the side wall end edges on the bed side or are in the state where they come in slide contact therewith. As a result, these rear door sections 3a and 3b, when opened, are positioned in parallel outside the left and right side walls 7A and 8A, respectively. On the other hand, when the operating rods 18A of the drive cylinders 17A are contracted, the left and right rear door sections 21 and 22 are rotationally shifted to the original closed positioned in an operating manner opposite to the above, respectively.

As is clear from the foregoing description, advantages as recited below are provided by this invention.

(1) Since the rear door is bisected into two rear door sections and the bisected left and right rear door sections are rotationally shifted to the outsides of the both side walls of the bed, respectively, when a load is dumped, no burden of the load is applied to the rear door and there is no possibility that the load slides on the rear door and falls down therefrom.

Accordingly, failure or trouble of respective of the opening and closing apparatus due to weight of load, or damage or injury of the rear door can be eliminated.

(2) Since the left and right rear door sections can be rotated in a horizontal state by a smaller force, the hydraulic cylinder can be small-sized.

Accordingly, the number of constituent parts can be reduced, so the opening and closing apparatus can be manufactured at a low cost.

(3) Since there is no necessity of attaching other members to the truck or frame side of a vehicle or of improving the frame side, the opening and closing apparatus is easily manufactured.

(4) In the case where arcuate portions are formed on the inner wall surfaces on the sides of the outside end portions of the left and right rear door sections, respectively, the rear door can be rotated with the radius between the pivotal pin of the connecting link and the side wall end edge of the bed being as short as possible. Further, the rear door can be smoothly rotated without being in contact with the side wall end edge of the bed when the rear door is opened and closed.

What is claimed is:

1. An apparatus for opening and closing a rear door of a vehicle comprising:
   bisected left and right rear door sections;
   drive links formed to be S-shaped as a whole and driven links formed to be L-shaped guiding said left and right rear door sections to the outsides of both side walls of a bed of said vehicle, respectively;
   drive cylinders provided on the lower surface of a floor of said bed;
   each of said S-shaped drive links having the inner end of the link being pivotally connected to the outer end of a piston rod of a drive cylinder, and the outer end of the link being pivotally mounted to the lower outside end portion of the right and left rear doors; and each of said L-shaped driven links having one end and the other end pivotally mounted to the rear end portion of the lower surface of a truck bed and the lower surface closer to the inside end portion of the rear door.

2. An apparatus for opening and closing a rear door of a vehicle comprising:

bisected left and right rear door sections;

drive cylinders provided on the lower surface of a bed of said vehicle; and connecting links formed to be dog-leg shaped or S-shaped each having an inner end portion pivotally supported on an operating rod of one of said drive cylinders and an outer end portion affixed to the outside end portions of one of said rear door sections for guiding said rear door section to the outside of a side wall of said bed and inner wall surfaces on the sides of outside end portions of said left and right rear door sections being formed arcuate, respectively.

3. An apparatus for opening and closing a rear door of a vehicle having an open bed for carrying a load and a side wall on each side of said bed, said apparatus comprising:

at least one rear door section;

a drive mechanism located below said open bed for driving said door section from a closed to an opened position;

said drive mechanism including door section supporting means connected only to a lower portion of said door section to completely support said door section continuously in a substantially perpendicular position with respect to said open bed whether said door section is in a closed or opened position; and said at least one door section, when in an opened position, being located outside of and substantially parallel to one of said side walls.

4. An apparatus for opening and closing a rear door of a vehicle as claimed is claim 1, wherein said drive mechanism includes a generally S-shaped link pivotally mounted on the lower surface of said bed, the inner end of said link being pivotally connected to the outer end of a piston rod of a drive cylinder, and the outer end of said generally S-shaped link being connected to said supporting means which is connected to the lower outside end portion of the said rear door section.

5. An apparatus for opening and closing a rear door of a vehicle as claimed is claim 1, wherein said rear door section, when in an opened position, is located outside of and substantially parallel to one of said side walls.

6. An apparatus for opening and closing a rear door of a vehicle as claimed is claim 1, wherein said rear door section, when in a closed position, has a first edge substantially perpendicular to said bed and located near a first of said side walls and a second edge substantially perpendicular to said bed and located further from said first of said side walls, and wherein said rear door section, when in an opened position, is located outside of and substantially parallel to said first of said side walls and said first edge is located forward of said second edge.

7. An apparatus for opening and closing a rear door of a vehicle as claimed is claim 1, wherein said at least one door section has an inner wall surface which includes a clearance portion to allow said door section to be moved outside of one of said side walls of said vehicle by passing closely around the rear edge of said side wall.

8. An apparatus for opening and closing a rear door of a vehicle as claimed is claim 1, wherein said at least one door section has an inner wall surface which includes an arcuate surface portion to allow said door section to be moved outside of one of said side walls of said vehicle by passing closely around the rear edge of said side wall.

9. An apparatus for opening and closing a rear door of a vehicle as claimed is claim 1, wherein said at least one door section has an outer wall surface which is substantially planar and an inner wall surface which includes a clearance portion to allow said door section to be moved outside of one of said side walls of said vehicle by passing closely around the rear edge of said side wall.

10. An apparatus for opening and closing a rear door of a vehicle as claimed is claim 1, wherein said at least one door section has an outer wall surface which is substantially planar and an inner wall surface which includes an arcuate surface portion to allow said door section to be moved outside of one of said side walls of said vehicle by passing closely around the rear edge of said side wall.

11. An apparatus for opening and closing a rear door of a vehicle as claimed is claim 1, wherein said vehicle is an open bed dump truck.

12. An apparatus for opening and closing a rear door of a vehicle as claimed is claim 1, wherein said vehicle is an open bed dump truck whose bed can be tilted to discharge a load.

13. An apparatus for opening and closing a rear door of a vehicle as claimed is claim 1, wherein said drive means includes at least one pivot element which is substantially perpendicular to said bed and around which said at least one door section rotates in moving from said closed position to said opened position.

14. An apparatus for opening and closing a rear door of a vehicle as claimed is claim 1, which includes a second rear door section and said door sections comprise right and left rear door sections for said vehicle.

* * * * *